United States Patent Office 2,794,053
Patented May 28, 1957

2,794,053

CATALYTIC DEHYDROGENATION OF SECONDARY ALCOHOLS TO KETONES

Royal K. Altreuter, Fair Haven, and William F. Segelken, Roselle, N. J., assignors to Esso Research and Engineering Company, a corporation of Delaware No Drawing. Application December 22, 1954, Serial No. 477,104

8 Claims. (Cl. 260—596)

The present invention relates to the dehydrogenation of organic compounds, and particularly to the dehydrogenation of secondary alcohols to ketones. More specifically, the present invention relates to a superior catalyst support for metallic oxide dehydrogenation catalysts. Still more specifically, the invention is concerned with a superior dehydrogenation catalyst comprising at least one metallic oxide on calcined coke support.

Numerous chemical reactions are carried out in the presence of catalysts which require deposition on catalyst supports. For example, the dehydrogenation of secondary alcohols to ketones is commonly accomplished by passing alcohol vapors at elevated temperatures over a catalytic metallic oxide supported on a carrier. Generally oxides of the metals of group II of the periodic table are employed with the addition thereto of metallic oxides of group IV and/or group V as catalyst promoters, stabilizers, etc. For purposes of this invention the term metallic oxide dehydrogenation catalyst will designate an oxide of a metal, preferably of group II, and 1 to 15% by weight of a metallic oxide of the IIIrd, IVth, and Vth group of the periodic table. During the dehydrogenation temperatures of 400° F. to 1000° F., generally 750° F. to 900° F. are employed. The catalytic metallic oxides function with a higher degree of efficiency when supported on a carrier than when used alone. Catalyst carriers commonly used are metallic machine turnings such as steel or brass turnings, metallic chips, pumice, alumina, porcelains, etc. of a size insuring good distribution of the oxide throughout the catalyst chamber. Metallic carriers have been afforded wide use commercially as a convenient, easily replaceable support.

The use of prior art supports has been accompanied by several marked drawbacks and difficulties. Among these was the rapid and extensive drop off in conversion yields as the catalyst remained in service. A further problem is the marked olefin selectivity, i. e. the tendency of the catalyst to cause dehydration rather than dehydrogenation of the alcohol. Still further, prior art catalyst, such as those supported on steel or brass turnings, was difficult to remove and discharge from the reactor tubes.

It has now been found that by use of coke of very low silica and ash content as support for dehydrogenation catalysts there is afforded a catalyst composition substantially free from the above mentioned defects. The support not only is considerably cheaper than metallic carriers, but also catalysts coated thereon display longer stability and higher conversions than the same catalyst deposited on metallic carriers, and show considerably less olefin selectivity.

It is essential that the carbon employed be substantially free of silica or siliceous material. These components have been found to promote the dehydration reaction and form olefins. For this reason, active charcoal and wood chars in general are not suitable as supports because of their silica content. However, coke prepared from selected coals, and from selected petroleum sources are particularly suitable. The coke must not have a silica content of more than 0.75% and preferably a total ash content of not more than 1.0 to 1.5%.

The catalyst is applied to the carrier by forming a slurry of the metallic oxide or oxides with water or other solvent until a paste-like consistency is obtained. The calcined coke in the form of lumps or granules of the appropriate size, preferably about ½" x ½" x ½" is mixed with the oxide paste and the oxide deposited thereon by known methods such as by tumbling in a ball mill. During the tumbling operation the oxide becomes deposited on the coke leaving the exterior surface of the mass relatively smooth. The particles are removed and dried at 100°–150° C. and are then ready for use in the reactor.

If desired, the calcined coke is water-washed or is advantageously treated, before use in the catalyst composition, with an aqueous solution of an alkaline reacting material, such as sodium or potassium hydroxide or ammonium hydroxide or the corresponding carbonate. Zince acetate has also been found extremely useful as a pretreating agent in minimizing olefin formation.

The metallic oxides preferably employed in the dehydrogenation catalyst are selected from the following group: zinc oxide, magnesium oxide, copper oxide, beryllium oxide, chromium oxide; while the following oxides are employed as stabilizers and promoters where desired: bismuth oxide, antimony oxide, zirconium oxide, thorium oxide, cerium oxide, vanadium oxide, etc. The amount of the latter oxides used varies between 1 and 15 wt. percent, preferably about 6 wt. percent based on the total weight of the mixture.

The following dehydrogenation runs in Example I demonstrate the effectiveness of the calcined coke-based catalyst and its superiority over the commercially employed brass-turning support. In this example, secondary butyl alcohol is dehydrogenated to methyl ethyl ketone (MEK).

EXAMPLE I

*Ketone catalyst study*

| Catalyst Carrier | Coke A | | Calcined Coke B | | Brass Turnings |
|---|---|---|---|---|---|
| Catalyst | Uncoated | Coated with 94% ZnO, 6% Bi₂O₃ | Uncoated | Coated with 94% ZnO, 6% Bi₂O₃ | Coated with 94% ZnO, 6% Bi₂O₃ |
| Analysis of Coke Ash, Wt. Percent | Approximately 10.0 | | <1.0 | | |
| Ketone Runs: | | | | | |
| Feed Rate, V./V./Hr. | 1.5 | 1.5 | 1.5 | 1.5 | 1.5 |
| Temperature, ° F. | 750 | 750 \| 900 | 750 | 750 \| 900 | 750 |
| Conversion (MEK), Wt. Percent | | 90.0 \| 91.0 | | 90.0 \| 93.5 | 88.5 |
| Olefin, Wt. Percent of Feed | 23.0 | 4.0 \| 3.6 | 1.0 | 2.6 \| 2.0 | 3.2 |

These data demonstrate the improved conversion of the alcohol to the ketone when using the calcined coke support, and also demonstrate clearly the increased olefin formation obtained when a high ash and silica content are present in the coke.

In a plant scale test it was found that after 50 days on stream, the rate of conversion dropped off only 0.3% per week for the calcined coke supported catalyst. The brass catalyst lost activity at the rate of 1.2% per week. This feature is of great importance in showing higher average yield and prolonged operation for the calcined coke-supported catalyst. It was also noted that the catalyst coating adhered to the calcined coke considerably better than to the brass turnings. Furthermore, the catalyst support is very light compared to brass, making the handling less cumbersome and labor consuming, so that at the end of the run, the unit was turned around in 2.2 days, a saving of 3.4 days over the brass catalyst turnarounds.

EXAMPLE II

In Example II there is presented data showing clearly the advantages that accrue employing the catalyst of the invention over the brass supported catalyst in terms of length of run in a commercial unit. It is necessary to terminate a run when olefin regeneration becomes too high, plugging occurs and hot spots appear.

| | Brass | Coke |
|---|---|---|
| Feed Rate_____g./hr__ | 1,460 | 1,460 |
| Length of Run_____hours__ | 1,354 | 2,040 |

Although the effectiveness of the calcined coke as a catalyst base has been demonstrated by the dehydrogenation of secondary alcohols to ketones, its use is by no means limited thereto. The calcined coke is suitable as a base for metallic oxide catalysts which catalyze the dehydrogenation of primary alcohols to their corresponding aldehydes, e. g. the dehydrogenation of ethyl alcohol to acetaldehyde. The material likewise is suitable for use in the dehydrogenation of hydrocarbons to produce hydrocarbons of greater unsaturation, e. g. the conversion of paraffins to mono-olefins and mono-olefins to diolefins.

The dehydrogenation is carried out in the usual manner already described in the art and the use of the calcined coke as the catalyst base requires no modifications of the reaction mechanism, or method of product recovery, etc. For example, the reaction conditions and process technique employed in the dehydrogenation of secondary alcohols to ketones are well described in the art, e. g. U. S. 2,039,543, 2,393,510, 2,436,733, 2,436,970, etc. and are illustrated in the preferred manner by the runs set forth in Example I of the specification.

What is claimed is:

1. A process for converting secondary aliphatic alcohols to ketones which comprises passing the alcohol under conversion conditions of temperature and pressure over a catalyst comprising a group II metal oxide coated on lumps of calcined coke having a total ash content of no more than 1.5%.

2. The process of claim 1 wherein said coke has a silica content of not more than 0.75 weight percent.

3. A process for converting secondary aliphatic alcohols to ketones which comprises passing the alcohol in the vapor phase under conversion conditions of temperature and pressure over a catalyst comprising a group II metal oxide coated on calcined coke having a total ash content of no more than 1.5%.

4. A process for converting secondary aliphatic alcohols to ketones which comprises passing the alcohol in the vapor phase under conversion conditions of temperature and pressure over a catalyst comprising zinc oxide and 1–15% by weight based on the total weight of the catalyst of a promoter selected from the group consisting of oxides of the metals of groups IV and V of the periodic system coated on lumps of calcined coke having a total ash content of no more than 1.5%.

5. A process for converting secondary aliphatic alcohols to ketones which comprises passing the alcohol in the vapor phase under conversion conditions of temperature and pressure over a catalyst comprising zinc oxide and 1–15% by weight based on the total weight of the catalyst of a promoter selected from the group consisting of oxides of the metals of groups IV and V of the periodic system coated on alkali-treated lumps of calcined coke having a total ash content of no more than 1.5%.

6. A process for converting secondary aliphatic alcohols to ketones which comprises passing the alcohol in the vapor phase under conversion conditions of temperature and pressure over a catalyst comprising zinc oxide and 1 to 15% by weight of the total oxides of bismuth oxide coated on lumps of calcined coke having a total ash content of no more than 1.5% and a silica content of no more than 0.75%.

7. A process according to claim 6 in which isopropanol is converted to acetone.

8. A process according to claim 6 in which secondary butanol is converted to methyl ethyl ketone.

References Cited in the file of this patent
UNITED STATES PATENTS

| 2,087,038 | McMahon et al. | July 13, 1937 |
| 2,097,154 | Groll et al. | Oct. 26, 1937 |
| 2,633,475 | Mattern | Mar. 31, 1953 |